United States Patent [19]

Tazi

[11] Patent Number: 5,159,034

[45] Date of Patent: Oct. 27, 1992

[54] POLYMERIZATION PROCESS USING TERTIARY-AMYLPEROXY PIVALATE AS THE FREE RADICAL INITIATOR

[75] Inventor: Mohammed Tazi, Wayne, N.J.

[73] Assignee: ISP Investments Inc., Wilmington, Del.

[21] Appl. No.: 612,028

[22] Filed: Nov. 5, 1990

Related U.S. Application Data

[62] Division of Ser. No. 401,682, Sep. 1, 1989, Pat. No. 5,082,910.

[51] Int. Cl.$^5$ .......................... C08F 4/28; C08F 26/10; C08L 39/06
[52] U.S. Cl. .................................... 526/227; 524/548; 526/263
[58] Field of Search ................. 526/263, 227; 524/548

[56] References Cited

U.S. PATENT DOCUMENTS

| | | | |
|---|---|---|---|
| 4,604,230 | 8/1986 | Goswami et al. | 523/400 |
| 4,652,398 | 3/1987 | Goswami et al. | 523/400 |
| 4,692,272 | 9/1987 | Goswami et al. | 523/400 |
| 4,816,534 | 3/1989 | Nuber et al. | 526/227 |

*Primary Examiner*—Paul R. Michl
*Assistant Examiner*—Peter Szekely
*Attorney, Agent, or Firm*—Walter Katz; Marilyn J. Maue; Joshua J. Ward

[57] ABSTRACT

Free radical polymerization of monomers in the presence of t-amylperoxy pivalate as the free radical initiator is described. Copolymers of maleic anhydride and a vinyl monomer, e.g. a $C_1$–$C_5$ alkyl vinyl ether, and water soluble polyvinylpyrrolidone, are representative polymers prepared in accordance with the process of the invention.

5 Claims, No Drawings

POLYMERIZATION PROCESS USING TERTIARY-AMYLPEROXY PIVALATE AS THE FREE RADICAL INITIATOR

This is a division of application Ser. No. 401,682, filed Sep. 1, 1989 now U.S. Pat. No. 5,087,910.

BACKGROUND OF THE INVENTION

1. Field of the Invention

This invention relates to a process for making polymers, and, more particularly, to a polymerization process using t-amylperoxy pivalate as the free radical initiator.

2. Description of the Prior Art

Free radical initiators used in polymerization processes at elevated temperatures have included alkyl peresters, dialkyl peroxides, perketals, peroxydicarbonates, hydroperoxides, azo compounds and carbon-carbon labile compounds. Copolymerization also has been carried out at relatively low temperatures, e.g. room temperature, using a redox catalyst, such as, a combination of a redox catalyst and ascorbic acid, or, of a peroxydicarbonate and benzoin. It has been possible also to employ the polymerization initiator conjointly with a suitable accelerator, for example, an amine derived from a cyclic or phenyl structure, the amine being used by itself or together with an organic compound of a transition metal. Copolymerization also has been carried out with a mixture of different polymerization initiators having different decomposition temperatures.

The following compounds have been employed in free radical initiated polymerizations: acetyl cyclohexanesulfonyl peroxide, diacetyl peroxydicarbonate, dicyclohexyl peroxydicarbonate, di-2-ethylhexyl peroxydicarbonate, tert-butyl per[oxy]-neodecanoate, 2,2'-azobis(4-methoxy-2,4-dimethylvaleronitrile); tert-butyl peroxy pivalate, dioctanoyl peroxide, dilauroyl peroxide, 2,2'-azobis-(2,4-dimethylvaleronitrile), tert-butylazo-2-cyanobutane; dibenzoyl peroxide, tert-butyl per[oxy]-2-ethylhexanoate, tert-butyl per[oxy]maleate, 2,2-azobis(isobutyronitrile); bis(tert-butylperoxy)cyclohexane, tert-butylperoxyisopropyl carbonate, tert-butyl per[oxy]acetate; 2,2-bis(tert-butylperoxy)butane, dicumyl peroxide, di-tert-amyl peroxide, di-tert-butyl peroxide, pinane hydroperoxide, cumene hydroperoxide, and tert-butyl hydroperoxide.

These polymerization initiators are used in amounts of about 0.05 to 10% by weight of the monomers, and, preferably about 0.1 to 5% by weight of an initiator is required.

t-Butylperoxy pivalate (TBPP) is a widely used free radical polymerization initiator: see U.S. Pat. Nos. 3,624,123; 3,887,528 and 4,237,257. TBPP undergoes thermal homolysis to produce t-butoxy and t-butyl free radicals.

Thermal Homolysis of TBPP

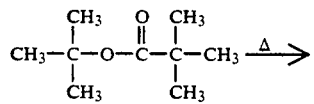

-continued

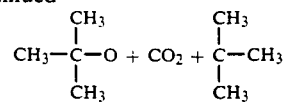

whereupon β-scission of the t-butoxy radical produces the methyl free radical:

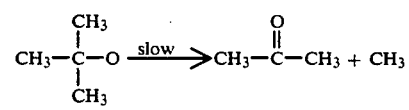

Thus, the active free radical species for initiation of free radical polymerization are:

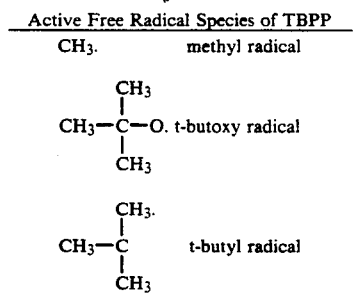

The methyl and t-butoxy free radicals, respectively, have high bond dissociation energies (BDE) of 104 and 105 kcal/mole. This means that these radicals can readily abstract a labile hydrogen atom from the polymer to convert an otherwise linear polymer into branched polymers which have lower water solubility and lower molecular weights than the linear polymers. In addition, the half-life of TBPP initiator, i.e. the time at a given temperature to effect a loss of one-half of the perester's active oxygen content, is a lengthy 24.6 hours at 50° C. Accordingly, TBPP requires a high reaction temperature, e.g. 60°-80° C., to carry out the polymerization within a reasonable period of time.

Accordingly, it is an object of this invention to provide polymerization processes using a free radical initiator whose thermal homolysis reaction provides free radicals which undergo rapid β-scission to produce active free radical species which are weak hydrogen abstractors, and, thus enable the formation of linear polymers having high degree of water solubility and high molecular weights.

SUMMARY OF THE INVENTION

A free radical initiated polymerization process is described herein in which at least one monomer is polymerized in the presence of t-amylperoxy pivalate as the free radical initiator. Representative polymerizations using the t-amylperoxy pivalate initiator of the invention include the copolymerization of maleic anhydride and a $C_1$–$C_5$ alkyl vinyl ether to produce 1:1 alternating copolymers, and the homopolymerization of vinyl pyrrolidone to form high molecular weight polyvinyl pyrrolidone.

The polymerization processes of the invention are carried out at a faster reactivity rate, and at a lower temperature, than the same polymerizations using related free radical initiators. The process herein may provide linear polymers of high molecular weight, as contrasted to branched polymers of low molecular weight, formed with other initiators.

DETAILED DESCRIPTION OF THE INVENTION

In accordance with the invention, a free radical polymerization process is provided herein in which t-amylperoxy pivalate (TAPP) is used as the free radical polymerization initiator. TAPP undergoes thermal homolysis as follows:

Thermal Homolysis of TAPP

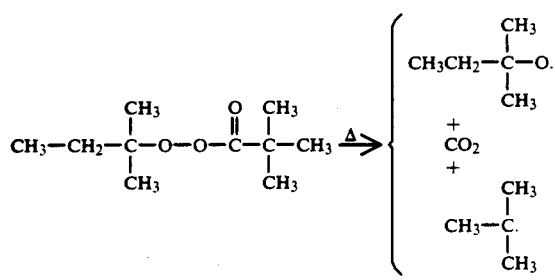

followed by β-scission of the t-amyloxy radical:

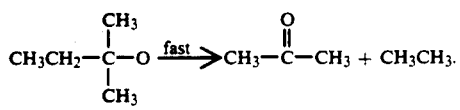

Accordingly the active free radical species of TAPP are:

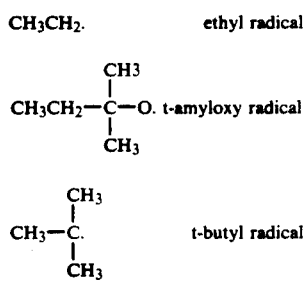

The ethyl and t-amyloxy free radical has a BDE of only 98 kcal/mole, and is therefore a relatively weak hydrogen abstractor. Thus, linear polymers can be provided using the TAPP initiator of the invention.

For example, polyvinylpyrrolidone (PVP) formed by free radical polymerization of vinyl pyrrolidone has several active hydrogen sites indicated by the asterisks for hydrogen abstraction, by active free radical species of TBPP

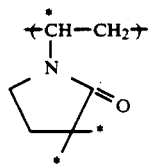

which would product branched PVP polymers:

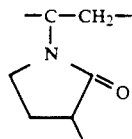

whereas TAPP, having weak hydrogen abstractors can produce more nearly linear PVP polymers having increased water dissolution.

The invention will now be described by reference to the following examples.

Furthermore, it is known that lower molecular weight polymers are produced when high polymerization temperatures or long reaction periods are required. TAPP, as compared to TBPP, can effect completed polymerizations at lower temperatures, and/or with shorter reaction periods, it is possible also to produce higher molecular weight polymers than heretofore achieved.

Suitably, the t-amylperoxy pivalate initiator of the invention may be used in free radical initiated polymerizations where at least one monomer is polymerizated in the presence of a free radical initiator. Representative free radical polymerizations include the preparation of maleic anhydride-based polymers, e.g. copolymerization of maleic anhydride with $C_1$-$C_5$ alkyl vinyl ethers, with styrene, and/or with acrylic acid; the preparation of polyvinylpyrrolidone by the homopolymerization of vinyl pyrrolidone, and for other free radical polymerizations well known in the art.

The t-amylperoxy pivalate initiator is employed in these polymerizations in an amount of about 0.01 to 10% by wt. of the monomers, preferably about 0.1 to 5%.

The polymers produced using the TAPP initiator are characterized by being more water soluble (more linear, less branched), of controlled (higher) viscosity (higher molecular weight) and with less residual monomer (<1000 ppm, higher purity, less toxic) than the same polymers made with other, even closely related free radical initiators.

The t-amylperoxy pivalate may be obtained from the Pennwalt Corp. under their commercial name of Lupersol 554M75, which is a 75% by wt. active solution in odorless mineral spirits.

EXAMPLE 1

Preparation of Polyvinylpyrrolidone

A 2-liter reactor was provided with agitation, gas inlet, condenser, and thermocouple and was charged with 270 g. (2.3 moles) of non-stabilized vinyl pyrrolidone monomer, buffered with 0.27 g. of tetrasodium pyrophosphate and 1,080 g. of deionized water. The reactor was swept clean of oxygen by admitting nitrogen gas through the inlet tube. Then the reactor was heated to 55° C. and 0.25 g. of t-amylperoxy pivalate was added (<0.1% by wt. of vinyl pyrrolidone). The reaction was carried out at 56°-59° C. for 5 hours. Then an additional 0.25 g. of TAPP was added and the reaction continued for 2 hours. At the end of the reaction period, the reaction product included 21% solids with a residual monomer content of only 0.04%. The PVP polymer product in water was characterized by a K-value of 121; a Brookfield viscosity of 120,000 cps at 26° C. and excellent water dissolution.

EXAMPLE 2

Preparation of Copolymers of Maleic Acid and Methyl Vinyl Ether

A 1-liter pressure reactor was charged with 63.8 g. of methyl vinyl ether and 143 g. of acetone. A solution of 98 g. of maleic anhydride in 147 g. of acetone was prepared and charged into a syringe pump. The reactor was heated until the temperature of the charge reached 55° C. Then 0.94 g. of t-amylperoxy pivalate (1% by wt. of maleic anhydride) was introduced in 20 ml. of the maleic anhydride solution in one shot. Thereafter, the rest of the solution was fed into the reactor continuously over a 4-hour period. Afterwards, the reaction mixture was held at 55° C. for an hour and the reactor was cooled to 25°–30° C. Excess methyl vinyl ether was removed and collected. The reaction product was discharged as a solution of maleic anhydride - methyl vinyl ether copolymer in acetone. The specific viscosity of the product at 25° C. was 0.38 as measured in 2-butanone (1% solution).

EXAMPLE 3

The procedure of Example 1 was followed to make PVP, using t-butylperoxy pivalate in place of t-amylperoxy pivalate. The product had a K-value of only 112; a residual monomer content of 0.14%, and relatively poor water dissolution.

EXAMPLE 4

The procedure of Example 2 was followed using t-butylperoxy pivalate. The specific viscosity of the copolymer was only 0.25.

While the invention has been described with particular reference to certain embodiments thereof, it will be understood that changes and modifications may be made which are within the skill of the art. Accordingly, it is intended to be limited by the appended claims only, in which:

What is claimed is:

1. A polymerization process for making a high molecular weight, substantially linear polyvinylpyrrolidone homopolymer having a K-value of about 121, a low residual vinyl pyrrolidone monomer content of about 0.04% or less, and an excellent water dissolution property, which comprises polymerizing a monomer consisting of vinyl pyrrolidone in aqueous solution in the presence of 0.1–10% by weight based on vinyl pyrrolidone of t-amylperoxy pivalate as a free radical initiator.

2. A polymerization process according to claim 1 in which the reaction temperature is about 56°–59° C.

3. A polymerization process according to claim 1 wherein the PVP polymer product in water has a 21% solids content, and a Brookfield viscosity of 120,000 cps at 26° C.

4. A polymerization process according to claim 1 wherein the initiator level is about 0.5 to 2%.

5. A high molecular weight, substantially linear homopolymer of polyvinylpyrrolidone in water made according to the process of claim 1 which, at about a 21% solids level, has a K-value of about 121, a Brookfield viscosity of about 120,000 cps at 26° C., and a residual monomer content of about 0.04% or less.

* * * * *